US011955299B2

(12) United States Patent
Knol et al.

(10) Patent No.: US 11,955,299 B2
(45) Date of Patent: Apr. 9, 2024

(54) OPERATING MECHANISM

(71) Applicant: Eaton Intelligent Power Limited, Dublin (IE)

(72) Inventors: Bert Knol, Overijssel (NL); Albert Postmus, Goor (NL); Adri Lammers, Overijssel (NL); Mathieu Hesselink, Goor (NL)

(73) Assignee: EATON INTELLIGENT POWER LIMITED, Dublin (IE)

( * ) Notice: Subject to any disclaimer, the term of this patent is extended or adjusted under 35 U.S.C. 154(b) by 75 days.

(21) Appl. No.: 17/659,430

(22) Filed: Apr. 15, 2022

(65) Prior Publication Data

US 2022/0336163 A1 Oct. 20, 2022

(30) Foreign Application Priority Data

Apr. 15, 2021 (GB) ..................................... 2105356

(51) Int. Cl.
*H01H 3/30* (2006.01)
*H01H 3/42* (2006.01)

(52) U.S. Cl.
CPC ........ *H01H 3/3031* (2013.01); *H01H 3/3015* (2013.01); *H01H 3/42* (2013.01); *H01H 2003/3036* (2013.01)

(58) Field of Classification Search
CPC ........ H01H 15/00; H01H 15/02; H01H 15/06; H01H 15/08; H01H 15/10; H01H 15/102; H01H 15/16; H01H 71/66; H01H 71/70; H01H 83/00; H01H 2001/50; H01H 2003/00; H01H 2003/02; H01H 2003/30; H01H 2003/3031; H01H 2003/3036; H01H 2003/32; H01H 2003/40; H01H 2003/46; H01H 3/00; H01H 3/001; H01H 3/02; H01H 3/30; H01H 3/3005; H01H 3/3031; H01H 3/3015; H01H 3/32; H01H 3/38; H01H 3/42; H01H 3/54
USPC ........................................................ 200/400
See application file for complete search history.

(56) References Cited

U.S. PATENT DOCUMENTS 11,031,191 B2 * 6/2021 Pinero ................. H01H 3/3021

FOREIGN PATENT DOCUMENTS

WO WO-2018115026 A1 * 6/2018

* cited by examiner

*Primary Examiner* — Anthony R Jimenez
(74) *Attorney, Agent, or Firm* — LEYDIG, VOIT & MAYER, LTD.

(57) ABSTRACT

The invention relates to an operating mechanism for opening and closing at least one contact, which operating mechanism comprises, a base frame, a bridge body movable relative to the base frame between a closed position and an opened position, a rod mechanism of a first and a second link, a cam arranged on a shaft, a locking lever fixedly arranged with one end to the first link and moves with the first rod between a locked position and an unlocked position, a control shaft having a D-shaft portion with a flat surface portion and a semi cylindrical surface portion, and a lock position, in which the path of the second end of the locking lever intersects with the circumference of the cross-section of the D-shaft portion.

5 Claims, 3 Drawing Sheets

OPERATING MECHANISM

CROSS-REFERENCE TO RELATED APPLICATIONS

This application claims priority pursuant to 35 U.S.C. 119(a) to United Kingdom Patent Application No. 2105356.6, filed Apr. 15, 2021, which application is incorporated herein by reference in its entirety.

SUMMARY

The invention relates to an operating mechanism for opening and closing at least one contact, which operating mechanism comprises:

- a base frame;
- a bridge body movable relative to the base frame between a closed position and an opened position, wherein the bridge body has a contact surface with a length and a width, which contact surface is configured to extend in length direction over and be in contact with the operating rod of the at least one contact;
- a rod mechanism of a first and a second link wherein the first ends of the two links are hinging with each other, wherein the second end of first link is hinging with the base frame and the second end of the second link is hinging with the bridging body;
- a cam arranged on a shaft, wherein the shaft is arranged adjacent to the rod mechanism, wherein the shaft extends parallel to the hinging axes of the rod mechanism and wherein the cam is in operating contact with the hinging axis of the first ends of the two links.

In larger (medium voltage) mechanical operated switchgear generally closing of the contact is achieved by the cam operating on the rod mechanism. The opening of the contact typically needs to be quick. This can be done by shaping the cam profile such, that with a minimal rotation of the cam from the closed position, the operating mechanism is release and free to move to the open position without intervention of the cam.

However in mechanical operated switchgear a spring could also be arranged to the cam, wherein the spring is energized at a certain level and then released to complete the closing operation. The spring is used for achieving the right speed and contact force. If the cam is used to keep the rod mechanism in closed position, the spring cannot be re-energized until the cam is rotated to open the contact.

It is an object of the invention to reduce or even remove the above mentioned disadvantages.

This object is achieved according to the invention with an operating mechanism for opening and closing at least one contact, which operating mechanism comprises, a base frame, a bridge body movable relative to the base frame between a closed position and an opened position, wherein the bridge body has a contact surface with a length and a width, which contact surface is configured to extend in length direction over and be in contact with the operating rod of the at least one contact, a rod mechanism of a first and a second link wherein the first ends of the two links are hinging with each other, wherein the second end of first link is hinging with the base frame and the second end of the second link is hinging with the bridging body, a cam arranged on a shaft, wherein the shaft is arranged adjacent to the rod mechanism, wherein the shaft extends parallel to the hinging axes of the rod mechanism and wherein the cam is in operating contact with the hinging axis of the first ends of the two links, a locking lever fixedly arranged with one end to the first link and moves with the first rod between a locked position and an unlocked position, a control shaft having a D-shaft portion with a flat surface portion and a semi cylindrical surface portion, wherein the D-shaft portion can be rotated between a pass position, in which the path of the second end of the locking lever is positioned outside of the circumference of the cross-section of the D-shaft portion, and a lock position, in which the path of the second end of the locking lever intersects with the circumference of the cross-section of the D-shaft portion.

The D-shaft portion in combination with the locking lever provides a lock for the rod mechanism, such that the contact can be kept in closed position, while the cam can be rotated further. When the contact needs to be opened, the D-shaft portion only has to be rotated to release the rod mechanism.

Now the cam can be rotated further, while the contact is maintained in the closed position, a spring provided to assist in the closing movement, can already be re-energized directly after the closing movement is completed.

In a preferred embodiment of the operating mechanism according to the invention a first spring is arranged to the control shaft to urge the control shaft in the lock position.

This allows for the locking lever to push the D-shaft portion into the pass position, after which the first spring will urge the D-shaft portion back into the lock position, such that the rod mechanism and the contact is locked in the closed position.

Preferably, a roller is arranged on the locking lever, wherein the roller forms the second end of the locking lever. The roller reduces any friction with the D-shaft portion and improves the urging by the locking lever of the D-shaft portion in the pass position.

In another embodiment of the operating mechanism according to the invention a cam follower is arranged on the hinging axis of the first ends of the first and second links and wherein the cam follower is configured to be in contact with the cam.

The cam follower reduces friction and wear between the cam and the rod mechanism.

In yet another embodiment of the operating mechanism according to the invention, the profile of the cam has a closing profile section for urging the rod mechanism in a stretched position, an opening profile section for letting the rod mechanism fold and an idle profile section, further comprising a closing spring for urging the closing profile section of the cam in contact with the hinging axis of the first ends of the two links.

BRIEF DESCRIPTION OF THE DRAWINGS

These and other features of the invention will be elucidated in conjunction with the accompanying drawings.

DETAILED DESCRIPTION

Figure 1:
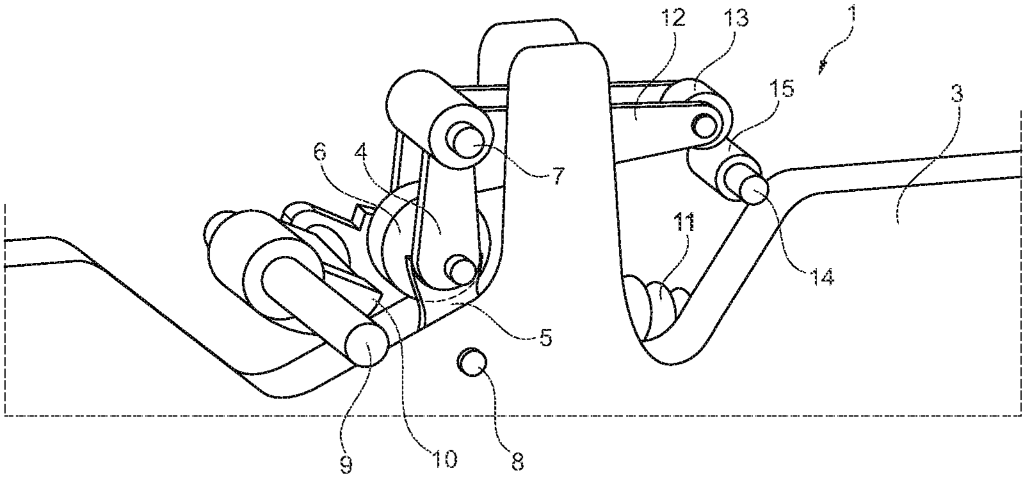
FIG. 1 shows a perspective view of a part of an embodiment of an operating mechanism according to the invention.

FIG. 1 shows an operating mechanism 1 for opening and closing a contact. The operating mechanism 1 has a base frame (not shown) and a bridge body 3 with which operating rods of contacts can be operated.

A rod mechanism of two links 4, 5, which are hinged on one end. A cam follower 6 is provided at this hinge axis. The first link 4 is hinged with the other end 7 to the base frame and the second link 5 is hinged with the other end 8 to the bridge body 3.

A camshaft 9 with a cam 10 is provided in operating contact with the cam follower 6 to urge the rod mechanism 4, 5 in a stretched position in which the contacts are closed and a collapsed position in which the contacts are opened. A closing spring 11 is connected to the camshaft 9 to assist in the closing movement.

A locking lever 12 is fixedly arranged to the first link 4 and provided with a roller 13 on the free end of the locking lever 12. A control shaft 14 with a D-shaft portion 15 is provided adjacent the roller 13, to lock the locking lever 12 when the rod mechanism 4, 5 is stretched and the contacts are closed.

Figure 2A:
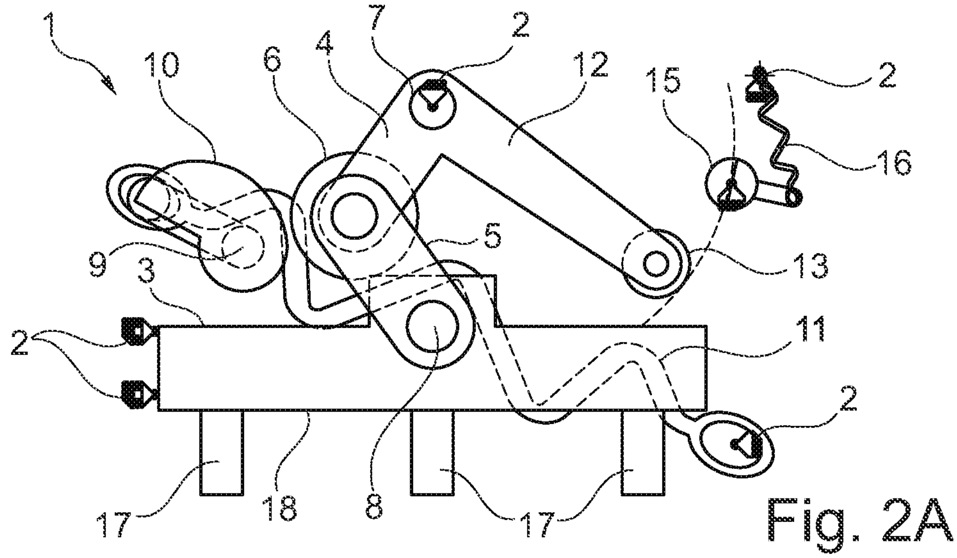
FIGS. 2A-2C show the embodiment of FIG. 1 in schematical view.

FIG. 2A shows the operating mechanism 1 as shown in FIG. 1 in more schematic view. The bridge body 3 is in a raised position, such that contacts 17 arranged against the contact surface 18 of the bridge body 3 are in an open position. The rod mechanism 4, 5 is collapsed position and the locking lever 12 is rotated away from the D-shaft portion 15, which is urged by a spring 16.

Figure 2B:
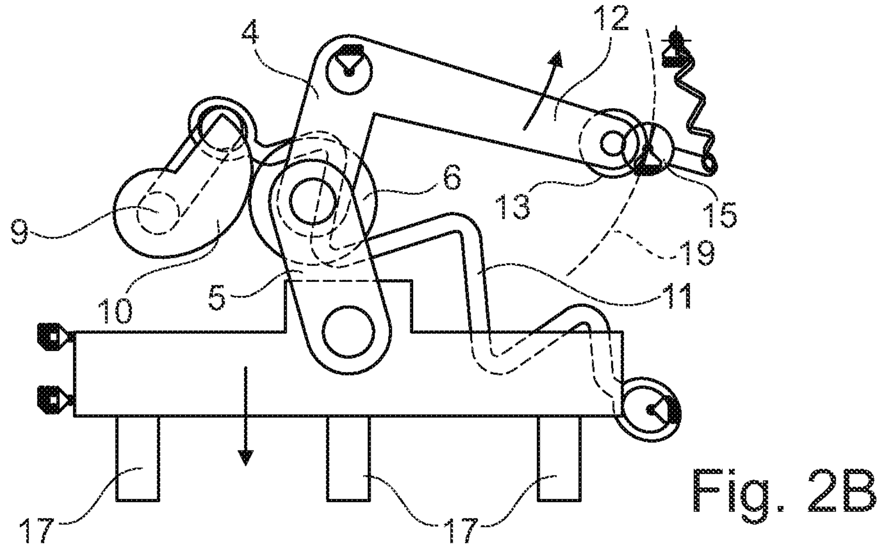

In FIG. 2B the cam shaft 9 is rotated such that the cam 10 operates on the cam follower 6 and pushes the rod mechanism 4, 5 in a stretched position, such that the bridge body 3 is moved down and the contacts 17 are closed. This closing action is assisted by the closing spring 11.

When the rod mechanism 4, 5 is moved to the stretched position, the locking lever 12 with the roller 13 moves along the path 19 and arrives at the D-shaft portion 15, which is positioned in a pass position, where the locking lever 12 with roller 13 can pass the D-shaft portion 15.

Figure 2C:
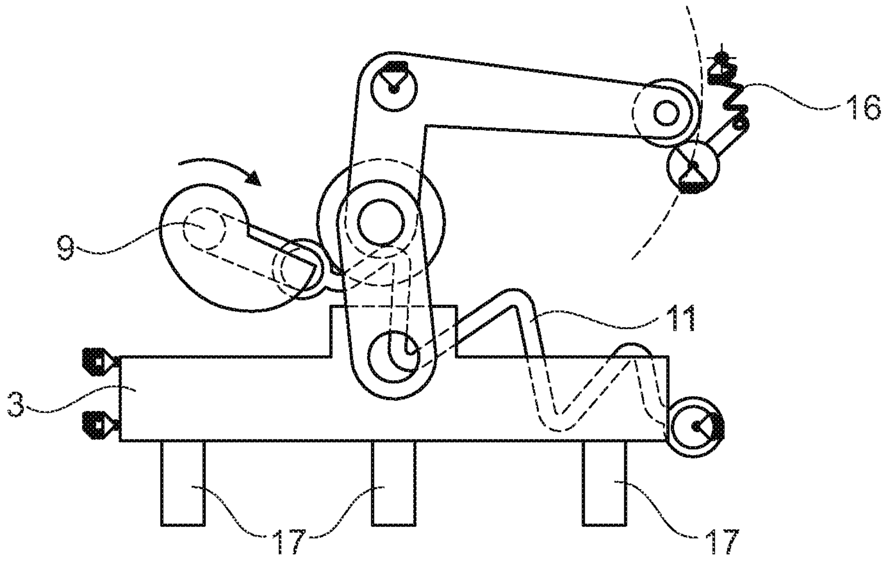

FIG. 2C shows the position of the bridge body 3 in closed position, in which the contacts 17 are also closed. The locking lever 12 with roller 13 has passed the D-shaft portion 15, which is rotated by the spring 16 in the lock position, which prevents the rod mechanism 4, 5 to return to the position of FIG. 2A. This allows for the camshaft 9 to be rotated further in order to re-energize the closing spring 11.

Figure 3A:
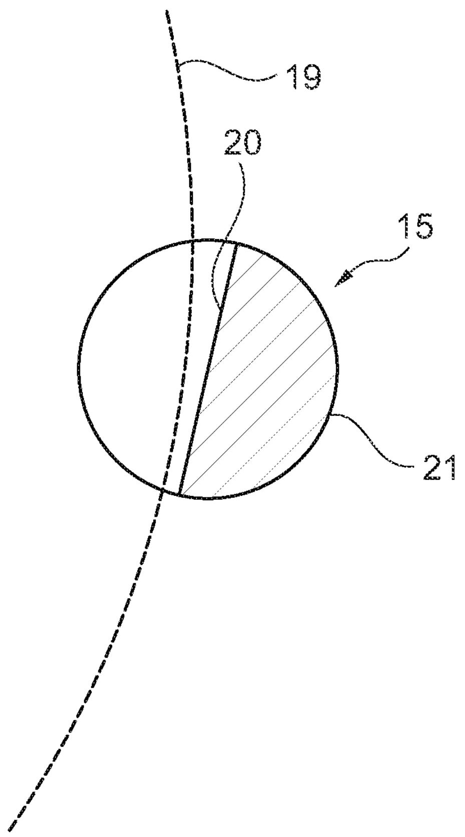
FIGS. 3A and 3B show a detail of the D-shaft portion in the pass position and the lock position respectively.
Figure 3B:
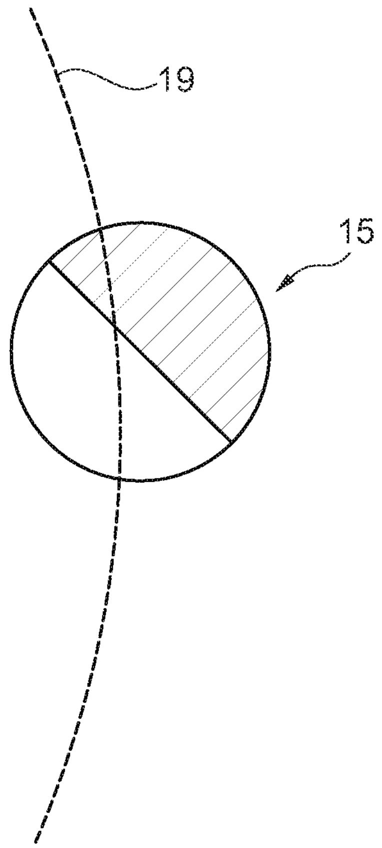

FIG. 3A shows the D-shaft portion 15. The cross-section has a circumference with a straight portion 20 and a semi cylindrical portion 21. In the pass position as shown in FIG. 3A, the path 19 of the locking lever 12 is positioned outside of the cross-section of the D-shaft portion 15.

FIG. 3A shows the D-shaft portion 15 in the lock position, where the path 19 intersects with the cross-section of the D-shaft portion 15.

What is claimed is:

1. An operating mechanism for opening and closing at least one contact the operating mechanism comprises:

a base frame;

a bridge body movable relative to the base frame between a closed position and an opened position, wherein the bridge body has a contact surface with a length and a width, the contact surface is configured to extend in a length direction over and be in contact with them operating rod of the at least one contact;

a rod mechanism formed of a first link and a second link, wherein a first end of each of the two links are affixed together and rotate about a common axis, wherein a second end of first link and the base frame are affixed together and rotate about a second common axis and a second end of the second link and a bridging body are affixed together and rotate about a third common axis;

a cam arranged on a shaft, wherein the shaft is arranged adjacent to the rod mechanism, wherein the shaft extends parallel to the common axis of the rod mechanism and wherein the cam is in operating contact with the common axis; wherein a locking lever fixedly arranged with one end to the first link and moves with the first link between a locked position and an unlocked position;

a control shaft having a D-shaft portion with a flat surface portion and a semi-cylindrical surface portion;

wherein the D-shaft portion can be rotated between a pass position, in which a path of the second end of the locking lever is positioned outside of a circumference of the cross-section of the D-shaft portion, and a lock position, in which the path of the second end of the locking lever intersects with the circumference of the cross-section of the D-shaft portion.

2. The operating mechanism according to claim 1, wherein a first spring is arranged to the control shaft to urge the control shaft in the lock position.

3. The operating mechanism according to claim 1, wherein a roller is arranged on the locking lever and wherein the roller forms the second end of the locking lever.

4. The operating mechanism according to claim 1, wherein a cam follower is arranged on the common axis and wherein the cam follower is configured to be in contact with the cam.

5. The operating mechanism according to claim 1, wherein a profile of the cam has a closing profile section for urging the rod mechanism into a stretched position, an opening profile section for folding the rod mechanism and an idle profile section, further comprising a closing spring for urging the closing profile section of the cam in contact with the common axis.

* * * * *